(12) United States Patent
Asada et al.

(10) Patent No.: US 12,392,707 B2
(45) Date of Patent: Aug. 19, 2025

(54) CORROSION-RESISTANCE TESTING METHOD FOR COATED METAL MEMBER, CORROSION-RESISTANCE TESTING APPARATUS FOR COATED METAL MEMBER, CORROSION-RESISTANCE TESTING PROGRAM FOR COATED METAL MEMBER, AND STORAGE MEDIUM

(71) Applicant: MAZDA MOTOR CORPORATION, Hiroshima (JP)

(72) Inventors: Teruaki Asada, Hiroshima (JP); Katsunobu Sasaki, Hiroshima (JP); Tatsuya Ezaki, Hiroshima (JP); Tsutomu Shigenaga, Hiroshima (JP); Akihide Takami, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 419 days.

(21) Appl. No.: 17/932,265

(22) Filed: Sep. 14, 2022

(65) Prior Publication Data
US 2023/0108997 A1 Apr. 6, 2023

(30) Foreign Application Priority Data
Oct. 1, 2021 (JP) ................. 2021-163038

(51) Int. Cl.
*G01N 17/02* (2006.01)
(52) U.S. Cl.
CPC ................... *G01N 17/02* (2013.01)
(58) Field of Classification Search
CPC ................ G01N 17/02; G01N 33/2045
See application file for complete search history.

(56) References Cited

U.S. PATENT DOCUMENTS 4,294,667 A * 10/1981 Yamamoto ............. G01N 22/04
204/404

FOREIGN PATENT DOCUMENTS

| JP | S61-54437 A | 3/1986 |
| JP | 2007-271501 A | 10/2007 |
| JP | 2009-168691 A | 7/2009 |
| JP | 2016-050915 A | 4/2016 |
| JP | 2019-032173 A | 2/2019 |

OTHER PUBLICATIONS

Takahashi et al., "Corrosion Resistance of Gas Shielded Metal Arc Welds with E-coat." SAE Transactions, vol. 106, Section 5: Journal of Materials &Manufacturing (1997), pp. 884-890 (Year: 1997).*

* cited by examiner

*Primary Examiner* — Alexander S Noguerola
(74) *Attorney, Agent, or Firm* — Studebaker Brackett PLLC

(57) ABSTRACT

A corrosion-resistance testing method for a coated metal member formed of a metallic substrate provided with a surface treatment coating includes an electrification step for applying a voltage and/or a current between a surface of the surface treatment coating and the metallic substrate in a state where a corrosion factor is in contact with the surface of the surface treatment coating so as to measure a temporal change in a current and/or a voltage occurring between the surface of the surface treatment coating and the metallic substrate, and an evaluation step for evaluating a defect occurrence status of the surface treatment coating based on a waveform of the temporal change.

18 Claims, 10 Drawing Sheets

FIG.5
| TYPE OF DEFECT | DIGITAL MICROSCOPE PHOTOGRAPH |
|---|---|
| GAS PINHOLE | 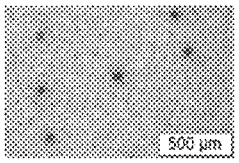 |
| SPATTER | 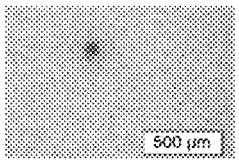 |
| SLAG |  |

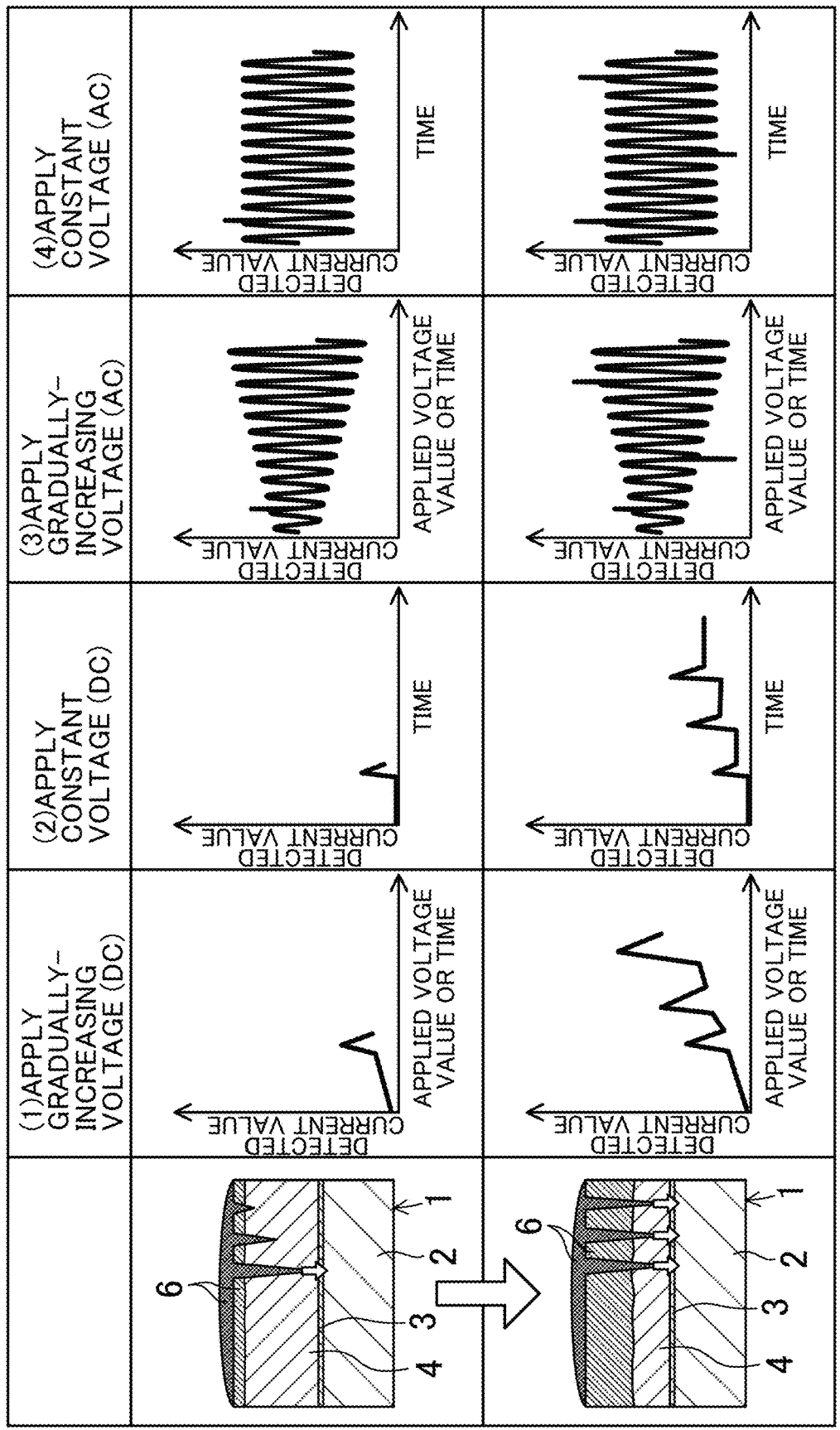

FIG.10

| TEST EXAMPLE | | 1 | 2-1 | 2-2 | 3 |
|---|---|---|---|---|---|
| TYPE OF DEFECT | | NORMAL COATING | GAS PINHOLE (MANY) | GAS PINHOLE (FEW) | CHEMICAL SLUDGE CONTAMINANT |
| COATING SPECIFICATIONS | ELECTRODEPOSITION BAKING | 160°C × 10 MINUTES | 140°C × 20 MINUTES | 140°C × 20 MINUTES | 140°C × 20 MINUTES |
| | COATING THICKNESS (μm) | 10 | 10 | 10 | 10 |
| WAVEFORM OF TEMPORAL CHANGE DATA | | (graph) | (graph) | (graph) | (graph) |
| DIGITAL MICROSCOPIC PHOTOGRAPH | | 30 DAYS AFTER CCT NORMAL COATING (COMPARISON); 60 DAYS AFTER CCT NORMAL COATING (COMPARISON) | 30 DAYS AFTER CCT; TP WITH MANY GAS PINHOLES | 30 DAYS AFTER CCT; TP WITH FEW GAS PINHOLES | — |

FIG.11

| TEST EXAMPLE | 4-1 | 4-2 | 5 | 6 |
|---|---|---|---|---|
| TYPE OF DEFECT | WELD SPATTER (MANY SPOTS) | WELD SPATTER (FEW SPOTS) | HOT-STAMPED MEMBER | UNKNOWN |
| COATING SPECIFICATIONS — ELECTRODEPOSITION BAKING | 160°C × 10 MINUTES | 160°C × 10 MINUTES | 140°C × 20 MINUTES | 140°C × 20 MINUTES |
| COATING SPECIFICATIONS — COATING THICKNESS (μm) | 30 | 30 | 10 | 10 |
| WAVEFORM OF TEMPORAL CHANGE DATA | (graph) | (graph) | (graph) | (graph) |
| DIGITAL MICROSCOPIC PHOTOGRAPH | AFTER COATING — TP WITH MANY SPATTER SPOTS | AFTER COATING — TP WITH FEW SPATTER SPOTS | 30 DAYS AFTER CCT — TP WITH MANY PROTRUSIONS AND RECESSES | 30 DAYS AFTER CCT — TP WITH MANY CORROSION ORIGINS |

CORROSION-RESISTANCE TESTING METHOD FOR COATED METAL MEMBER, CORROSION-RESISTANCE TESTING APPARATUS FOR COATED METAL MEMBER, CORROSION-RESISTANCE TESTING PROGRAM FOR COATED METAL MEMBER, AND STORAGE MEDIUM

CROSS REFERENCES TO RELATED APPLICATIONS

The present disclosure contains subject matter related to Japanese Patent Application No. 2021-163038 filed in the Japan Patent Office on Oct. 1, 2021, the entire contents of which are incorporated herein by reference.

BACKGROUND OF THE INVENTION

1. Field of the Invention

The present disclosure relates to corrosion-resistance testing methods for coated metal members, corrosion-resistance testing apparatuses for coated metal members, corrosion-resistance testing programs for coated metal members, and storage media.

2. Description of the Related Art

In the related art, accelerated corrosion tests, such as combined cycle tests and salt-spray tests, have been performed for evaluating coating performance.

However, since such an accelerated corrosion test requires several months for an evaluation, it is difficult to simply evaluate the state of a coating with different components and different baking conditions of, for example, a coated steel plate and to quickly optimize the coating conditions. Therefore, in material development sites, process management sites of coating factories, and quality management sites related to automotive corrosion prevention, there are demands for establishing a quantitative evaluation method for quickly and easily evaluating the corrosion resistance of coated steel plates.

Japanese Unexamined Patent Application Publication No. 61-54437 describes a method for predicting the lifespan of coated metal. This method involves applying a direct-current voltage between the coated metal and a counter electrode that are set in a practical or test environment, measuring the current flowing during this voltage application to preliminarily calculate a temporal change in the current, and subsequently performing extrapolation up to a current value corresponding to an arbitrary opening area of a coating so as to determine a time period during this time as the lifespan.

Japanese Unexamined Patent Application Publication No. 2007-271501 describes a method for evaluating the corrosion resistance of a coating formed over the surface of a metallic member. This method involves immersing the metallic member and a counter electrode member in water or an electrolytic solution, electrically connecting a negative terminal and a positive terminal of a measurement power supply to the metallic member and the counter electrode member, respectively, and evaluating the anti-corrosion performance of a coating based on an oxygen diffusion limitation current flowing through the metallic member from the counter electrode member via the coating.

In Japanese Unexamined Patent Application Publication No. 2016-50915, an electrode is disposed at the coating surface side of a coated metal member with an electrolyte material interposed therebetween, a voltage is applied between a substrate of the coated metal member and the coating surface, and the corrosion resistance of the coated metal member is evaluated based on a voltage value when the coating electrically breaks down.

SUMMARY OF THE INVENTION

In the techniques described in the above documents, the lifespan of a coating can be predicted, and the overall corrosion resistance of the coating can be evaluated. However, there is room for improvement from the standpoint of evaluating the state of the coating in more detail.

The present disclosure provides a corrosion-resistance testing method for a coated metal member, a corrosion-resistance testing apparatus for a coated metal member, a corrosion-resistance testing program for a coated metal member, and a storage medium storing the program by which the state of a surface treatment coating can be evaluated accurately and readily in more detail.

In order to solve the aforementioned problems, an embodiment of the present disclosure provides a corrosion-resistance testing method for a coated metal member formed of a metallic substrate provided with a surface treatment coating. The corrosion-resistance testing method for the coated metal member includes an electrification step for applying a voltage and/or a current between a surface of the surface treatment coating and the metallic substrate in a state where a corrosion factor is in contact with the surface of the surface treatment coating so as to measure a temporal change in a current and/or a voltage occurring between the surface of the surface treatment coating and the metallic substrate, and an evaluation step for evaluating a defect occurrence status of the surface treatment coating based on a waveform of the temporal change.

Normally, a coated metal member provided with a surface treatment coating starts to corrode when a corrosion factor, such as salt water or electrolyte-containing mud, penetrates the surface treatment coating and reaches the metallic substrate. Specifically, the corrosion process of the coated metal member is divided into a process up to the occurrence of corrosion and a process during which the corrosion progresses. An evaluation can be performed by determining the period (i.e., corrosion suppression period) up until the corrosion starts and the rate at which the corrosion progresses (i.e., corrosion progression rate).

For example, Japanese Unexamined Patent Application Publication No. 2016-50915 involves bringing the corrosion factor into contact with the surface of the surface treatment coating, applying a voltage between the surface of the surface treatment coating and the metallic substrate, and evaluating the aforementioned corrosion suppression period for the corrosion resistance of the coated metal member based on a voltage value when the coating electrically breaks down. In detail, in a case where the surface treatment coating is a normal coating, an electric current hardly flows between the surface of the surface treatment coating and the metallic substrate when a voltage that gradually increases relative to time is applied. However, the current value increases rapidly when the voltage exceeds a certain voltage value. This rapid increase in the detected current value indicates that the penetration of the corrosion factor into the surface treatment coating is accelerated in accordance with the voltage application and that the corrosion factor has reached the surface of the metallic substrate. Specifically, assuming that the applied voltage value when the detected current value reaches a predetermined threshold value is defined as an insulation voltage, the time until the insulation voltage is reached corresponds to a period up until the corrosion factor reaches the steel plate, that is, the corrosion suppression period of the coated metal member.

However, if the surface treatment coating has, for example, a local defect, it is predicted that the waveform of a temporal change in the detected current value varies from the waveform described above. In detail, at a location where the defect exists in the surface treatment coating, the effective coating thickness is conceivably smaller than that at a location where the defect does not exist. When a voltage and/or a current are/is applied, the corrosion factor tends to reach the metallic substrate more readily at the location where the defect exists. As a result, conduction tends to occur readily. When the corrosion factor reaches the metallic substrate, an electrochemical reaction, such as electrolysis of water, may occur at the surface of the metallic substrate, and the resultant gas or electrolysis product may block the defective location, possibly blocking the conduction. Specifically, when there is a local defect, the conduction and the blockage thereof at the defective location may cause the waveform of the temporal change in the current and/or the voltage to have a recessed and projected shape indicating an increase and a decrease in the current value and/or the voltage value. Therefore, by analyzing the waveform of the temporal change, the defect occurrence status of the surface treatment coating, such as whether or not a defect exists, the effective coating thickness at a defective location, and the number of defects per unit area, can be evaluated readily and accurately. Thus, the reliability of the corrosion resistance test is enhanced. Furthermore, with the present disclosure, corrosion-resistance-related information about the surface treatment coating of the coated metal member can quantitatively serve as digital data.

In this description, the term "temporal change (data)" may refer to data in which a detected current value and/or a detected voltage value are/is plotted out relative to time. If a gradually-increasing voltage and/or current are/is to be applied, the term "temporal change (data)" may refer to data in which a detected current value and/or a detected voltage value are/is plotted out relative to the applied voltage value and/or the applied current value.

The evaluation step may include evaluating the defect occurrence status based on a peak of the waveform.

If the defect is sufficiently local, a peak indicating a rapid increase and a rapid decrease in the current value and/or the voltage value may appear in the waveform of the temporal change in the current and/or the voltage. The applied voltage value and/or the applied current value providing this peak may reflect the effective coating thickness at the defective location. Specifically, if there are a plurality of local defects, a plurality of peaks corresponding to the respective defects may appear at the applied voltage values and/or the applied current values corresponding to the respective effective coating thicknesses. Therefore, by analyzing, for example, the number of peaks, the applied voltage value and/or the applied current value providing each peak, and a peak value of the detected current and/or voltage, the defect occurrence status can be evaluated in more detail.

The electrification step may include applying the voltage and/or the current gradually increasing relative to time or gradually increasing proportionally relative to time.

With the applied voltage and/or current gradually increasing relative to time, preferably, gradually increasing proportionally relative to time, the defect occurrence status of the surface treatment coating can be evaluated accurately within a shorter period of time.

The metallic substrate may include a chemical conversion coating formed on a surface of the metallic substrate, and the surface treatment coating may be provided on the surface of the metallic substrate with the chemical conversion coating interposed therebetween.

The metallic substrate may be a steel plate for an automotive component.

The surface treatment coating may be an electrodeposition coating formed by using a resin-based coating material.

An embodiment of the present disclosure provides a corrosion-resistance testing apparatus for a coated metal member formed of a metallic substrate provided with a surface treatment coating. The corrosion-resistance testing apparatus for the coated metal member includes: an electrode disposed at the surface treatment coating side of the coated metal member; a power supply configured to apply a voltage and/or a current between the electrode and the metallic substrate in a state where a corrosion factor is disposed between the surface treatment coating and the electrode and in contact with the surface treatment coating and the electrode; a detector configured to detect a current and/or a voltage occurring between the electrode and the metallic substrate in accordance with the voltage and/or the current applied by the power supply; and an evaluator configured to evaluate a defect occurrence status of the surface treatment coating based on a waveform of a temporal change in the current and/or the voltage detected by the detector.

According to this configuration, by analyzing the waveform of the temporal change in the current and/or the voltage, the defect occurrence status of the surface treatment coating, such as whether or not a defect exists, the effective coating thickness at a defective location, and the number of defects per unit area, can be evaluated readily and accurately, whereby the reliability of the corrosion resistance test is enhanced. Furthermore, with the present disclosure, corrosion-resistance-related information about the surface treatment coating of the coated metal member can quantitatively serve as digital data.

The evaluator may be configured to evaluate the defect occurrence status based on a peak of the waveform.

According to this configuration, the defect occurrence status can be evaluated in more detail by analyzing, for example, the number of peaks, the applied voltage value and/or the applied current value providing the peak, and a peak value of the detected current and/or voltage.

The power supply may be configured to apply the voltage and/or the current gradually increasing relative to time or gradually increasing proportionally relative to time.

With the applied voltage and/or current gradually increasing relative to time, preferably, gradually increasing proportionally relative to time, the defect occurrence status of the surface treatment coating can be evaluated accurately within a shorter period of time.

At least the above-described evaluation step is programmed as a corrosion-resistance testing program. Specifically, an embodiment of the present disclosure provides a corrosion-resistance testing program for a coated metal member formed of a metallic substrate provided with a surface treatment coating. The corrosion-resistance testing program causes a computer to execute a process including evaluating a defect occurrence status of the surface treatment coating based on a waveform of a temporal change in a current and/or a voltage occurring between a surface of the surface treatment coating and the metallic substrate as a result of applying a voltage and/or a current between the surface of the surface treatment coating and the metallic substrate in a state where a corrosion factor is in contact with the surface of the surface treatment coating.

An embodiment of the present disclosure provides a computer-readable storage medium storing the aforementioned corrosion-resistance testing program for the coated metal member.

The surface treatment coating may be insulative.

Moreover, a location where a defect exists may be where the surface treatment coating exists, and a coating thickness of the surface treatment coating at the location where the defect exists may be smaller than the coating thickness of the surface treatment coating at a location where the defect does not exist. In other words, in this configuration, the location where the "defect" serving as an evaluation target exists may be where the coating thickness of the surface treatment coating is not zero but is smaller than that at the location where the defect does not exist prior to the electrification step. Specifically, prior to the electrification step, the aforementioned "defect" may be such that it does not include a through-hole extending through the surface treatment coating in the thickness direction thereof.

In this configuration, the corrosion factor is brought into contact with the surface of the surface treatment coating, and the voltage and/or the current are/is applied between the surface of the surface treatment coating and the metallic substrate, so that the corrosion factor is caused to penetrate the surface treatment coating. Based on the temporal change in the detected current and/or voltage, the defect occurrence status is evaluated. The surface treatment coating retains insulative properties for some time from the start of the electrification step, but electrically breaks down when the corrosion factor penetrates the surface treatment coating and eventually reaches the metallic substrate. Thus, conduction occurs, thus causing a current value and/or a voltage value to be detected to increase.

In this configuration, the location where the defect serving as an evaluation target exists is where the coating thickness of the surface treatment coating is smaller than that at the location where the defect does not exist, so that the corrosion factor tends to reach the metallic substrate more readily. As a result, conduction tends to occur readily. When the corrosion factor reaches the metallic substrate, an electrochemical reaction, such as electrolysis of water, may occur at the surface of the metallic substrate, and the resultant gas or electrolysis product may block the defective location, possibly blocking the conduction. Specifically, in this configuration, the conduction and the blockage thereof at the location where the defect serving as an evaluation target exists may cause the waveform of the temporal change in the current and/or the voltage to have a recessed and projected shape indicating an increase and a decrease in the current value and/or the voltage value.

In this configuration, the waveform of the temporal change in the current value and/or the voltage value obtained by reflecting the above-described mechanism is analyzed, so that the defect occurrence status of the surface treatment coating, such as whether or not a defect exists, the effective coating thickness at a defective location, and the number of defects per unit area, can be evaluated readily and accurately. Thus, the reliability of the corrosion resistance test is enhanced, and corrosion-resistance-related information about the surface treatment coating of the coated metal member can quantitatively serve as digital data.

As described above, according to the present disclosure, the waveform of the temporal change in the current and/or the voltage is analyzed so that the defect occurrence status of the surface treatment coating, such as whether or not a defect exists, the effective coating thickness at a defective location, and the number of defects per unit area, can be evaluated readily and accurately. Thus, the reliability of the corrosion resistance test is enhanced. Furthermore, with the present disclosure, corrosion-resistance-related information about the surface treatment coating of the coated metal member can quantitatively serve as digital data.

BRIEF DESCRIPTION OF THE DRAWINGS

FIG. 5 illustrates digital microscope photographs indicating examples of local defects;

FIG. 9 is a diagram for explaining the concept of the corrosion-resistance testing method according to the first embodiment;

FIG. 10 is a graph illustrating results of corrosion resistance tests according to test examples;

FIG. 11 is a chart illustrating results of corrosion resistance tests according to test examples.

DESCRIPTION OF THE PREFERRED EMBODIMENTS

Figure 1:
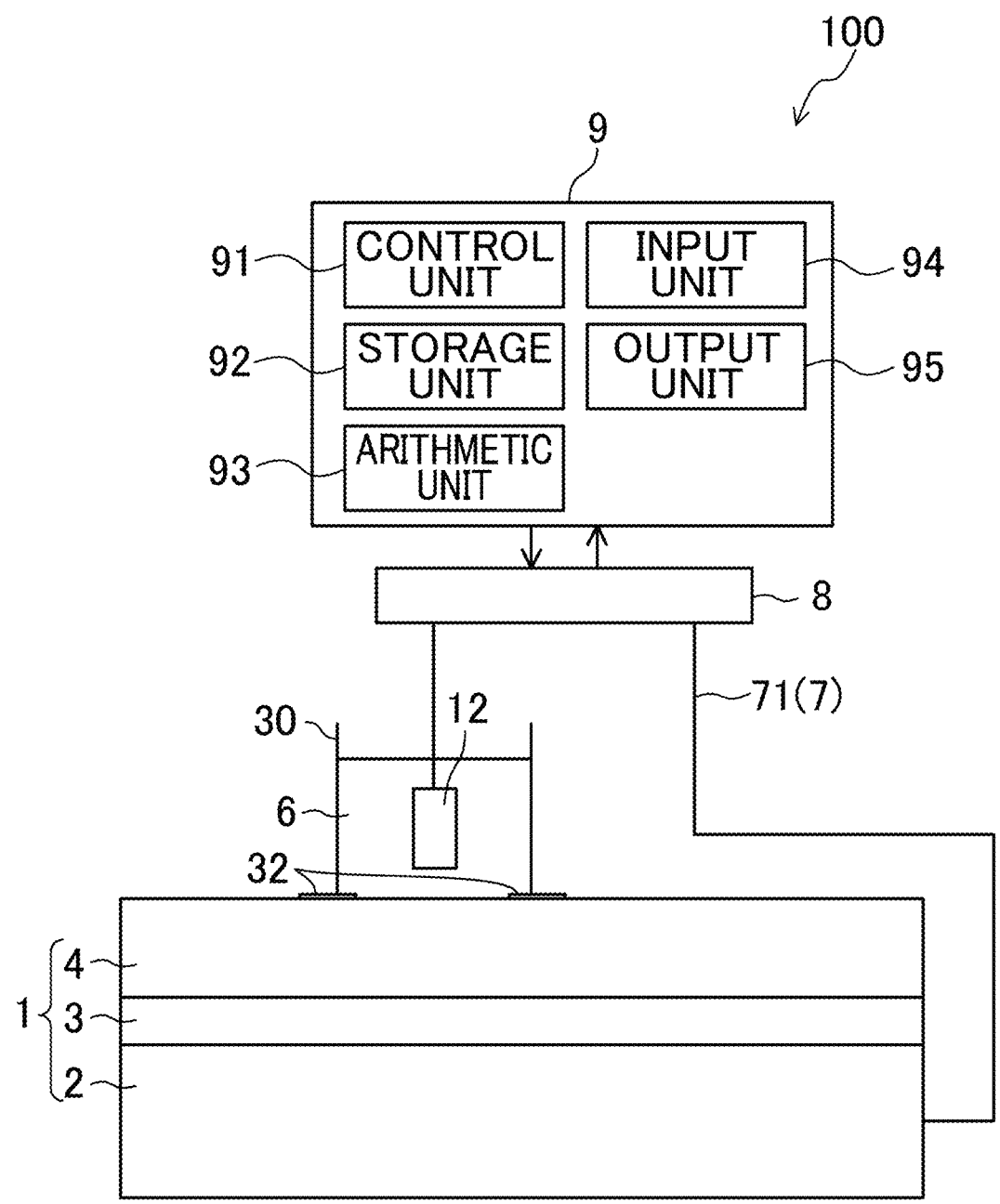
FIG. 1 illustrates an example of a corrosion-resistance testing apparatus for a coated metal member according to a first embodiment.

Embodiments of the present disclosure will be described in detail below with reference to the drawings. The description of the following preferred embodiments is substantially exemplary and is not intended whatsoever to limit the present disclosure, the application thereof, or the purpose thereof.

First Embodiment

Coated Metal Member

A coated metal member 1 as an object to be tested in a corrosion resistance test according to a first embodiment is formed of a metallic substrate provided with a surface treatment coating.

The metallic substrate is, for example, a steel member constituting a household electrical appliance, a construction material, or an automotive component. For example, the metallic substrate may be a steel plate cold (SPC), an alloyed hot dip galvanized steel sheet (GA), a high-tensile steel plate, or a hot-stamped material, or may be a light-alloy material. The metallic substrate is preferably a steel plate for an automotive component. The metallic substrate may have a chemical conversion coating (such as a phosphate coating (e.g., a zinc phosphate coating) or a chromate coating) on the surface thereof.

The surface treatment coating is formed by using a resin-based coating material. In other words, the surface treatment coating is preferably a resin coating, and is more preferably an electrodeposition coating. A specific example of the resin coating is an epoxy-resin-based or acrylic-resin-based cationic electrodeposition coating (i.e., an undercoating).

The coated metal member may include a multilayer coating having two or more layers as the surface treatment coating. In detail, for example, if the surface treatment coating is a resin coating, the surface treatment coating may be a multilayer coating formed by stacking an overcoating over an electrodeposition coating, or may be a multilayer coating formed by stacking an intermediate coating and an overcoating over an electrodeposition coating.

The intermediate coating has a role of ensuring the finished quality and the anti-chipping properties of the coated metal member, as well as enhancing the adhesiveness between the electrodeposition coating and the overcoating. The overcoating ensures the color of the coated metal member, the finished quality thereof, and the weather resistant properties thereof. In detail, for example, these coatings may be composed of a coating material constituted of base resin, such as polyester resin, acrylic resin, or alkyd resin, and a crosslinking agent, such as melamine resin, urea resin or a polyisocyanate compound (including a blocked type).

The following description relates to an example of the coated metal member 1 in which a metallic substrate having a chemical conversion coating 3 formed over the surface of a steel plate 2 is provided with an electrodeposition coating 4 (i.e., a resin coating) serving as a surface treatment coating.

Corrosion Factor

A corrosion factor 6 is an electrolyte material at least containing water and a supporting electrolyte, and functions as a conductive material. In the market, salt water or mud containing an electrolyte component may act as a corrosion factor. When the corrosion factor 6 simulating such a material acting as a corrosion factor is brought into contact with the surface of the electrodeposition coating 4 to apply a voltage and/or a current in an electrification step S2 to be described later, the penetration of the corrosion factor 6 into the electrodeposition coating 4 is accelerated, so that the time required for a corrosion resistance test can be shortened. The corrosion factor 6 may be a mud-like object further containing a clay mineral. With the corrosion factor 6 containing a clay mineral, ions and water in the corrosion factor 6 can readily penetrate the electrodeposition coating 4 in the electrification step S2 to be described later.

The supporting electrolyte is salt and is provided for adding sufficient conductivity to the corrosion factor 6. In detail, for example, the supporting electrolyte used may be at least one salt selected from sodium chloride, sodium sulfate, calcium chloride, calcium phosphate, potassium chloride, potassium nitrate, potassium hydrogen tartrate, and magnesium sulfate. In particular, the supporting electrolyte used may preferably be at least one salt selected from sodium chloride, sodium sulfate, and calcium chloride. The amount of supporting electrolyte contained in the corrosion factor 6 is preferably between 1% by mass and 20% by mass inclusive, more preferably between 3% by mass and 15% by mass inclusive, and even more preferably between 5% by mass and 10% by mass inclusive.

The clay mineral turns the corrosion factor 6 into a mud-like object and is provided for accelerating the movement of ions and the penetration of water into the electrodeposition coating 4. An example of the clay mineral used may be a layered silicate mineral or zeolite. An example of the layered silicate mineral used may be at least one selected from kaolinite, montmorillonite, sericite, illite, glauconite, chlorite, and talc, and may preferably be kaolinite. The amount of clay mineral contained in the corrosion factor is preferably between 1% by mass and 70% by mass inclusive, more preferably between 10% by mass and 50% by mass inclusive, and even more preferably between 20% by mass and 30% by mass inclusive. With the corrosion factor 6 being a mud-like object, the corrosion factor 6 can be provided on the surface of the electrodeposition coating 4 even in a case where the electrodeposition coating 4 is not horizontal.

The corrosion factor 6 may further contain an additive other than the water, the supporting electrolyte, and the clay mineral. Specific examples of such an additive include an organic solvent, such as acetone, ethanol, toluene, or methanol, and a material that enhances coating wettability. Such an organic solvent and/or material may also have the function for accelerating the penetration of water into the electrodeposition coating 4. Such an organic solvent and/or material may be added to the corrosion factor 6 in place of the clay mineral. In a case where the corrosion factor 6 contains an organic solvent, the amount of organic solvent contained in the corrosion factor 6 preferably ranges between 5% and 60% in terms of the volume ratio relative to water. This volume ratio preferably ranges between 10% and 40% inclusive, and more preferably ranges between 20% and 30% inclusive.

Corrosion-Resistance Testing Apparatus for Coated Metal Member

FIG. 1 illustrates an example of a corrosion-resistance testing apparatus 100 for a coated metal member according to this embodiment.

As shown in FIG. 1, the corrosion-resistance testing apparatus 100 according to this embodiment includes a container 30, an electrode 12, an external circuit 7, an electrifier 8 (power supply, detector), and a controller 9 (evaluator).

Container

The container 30 is placed on the electrodeposition coating 4 of the coated metal member 1 with an anti-leakage sealing member 32 interposed therebetween. The corrosion factor 6 is in contact with the surface of the electrodeposition coating 4 in a state where the corrosion factor 6 is contained in the container 30.

The container 30 is not particularly limited in shape and may have, for example, a cylindrical shape, such as a circular cylindrical shape or a polygonal cylindrical shape. The container 30 may be composed of a resin material, such as acrylic resin, epoxy resin, or aromatic polyether ether ketone (PEEK), or a ceramic material. In particular, the container 30 may preferably be composed of a resin material, such as acrylic resin, epoxy resin, or aromatic polyether ether ketone (PEEK). Accordingly, the corrosion-resistance testing apparatus 100 can be reduced in weight and cost while insulation properties between the container 30 and the outside can be ensured.

The sealing member 32 is, for example, a sheet-like sealing member composed of silicone resin. When the container 30 is placed on the coated metal member 1, the sealing member 32 can enhance the adhesiveness between the container 30 and the electrodeposition coating 4 and can also fill in the gap therebetween. Accordingly, leakage of the corrosion factor 6 from between the container 30 and the electrodeposition coating 4 can be effectively suppressed. Although a configuration not provided with the sealing member 32 is also possible, the sealing member 32 is preferably provided from the standpoint of sufficiently suppressing leakage of the corrosion factor 6.

Electrode

The electrode 12 is used for applying a voltage between the steel plate 2 and the surface of the electrodeposition coating 4, and is disposed at the electrodeposition coating 4 side of the coated metal member 1. The corrosion factor 6 is disposed between the electrodeposition coating 4 and the electrode 12 so as to be in contact with the electrodeposition coating 4 and the electrode 12. In detail, the electrode 12 is provided such that at least an end thereof is embedded in the corrosion factor 6, and is in contact with the corrosion factor 6.

The electrode 12 may be an electrode normally used in electrochemical measurement. In detail, for example, a carbon electrode or a platinum electrode may be used as the electrode 12.

The electrode 12 may have a shape, such as a rod shape or a tabular shape, normally used in electrochemical measurement. Furthermore, for example, the electrode 12 used may be a perforated electrode having at least one hole at an end thereof. For example, if a perforated electrode having a ring-shaped end is to be used, the perforated electrode may be disposed such that the ring is substantially parallel to the electrodeposition coating 4. Alternatively, a meshed electrode may be used as the perforated electrode, and may be disposed substantially parallel to the electrodeposition coating 4 while being embedded in the corrosion factor 6.

External Circuit

The external circuit 7 includes a wire 71 and the electrifier 8 disposed on the wire 71. The wire 71 is electrically connected to the electrode 12 and the steel plate 2. A commonly known wire may be appropriately used as the wire 71.

Electrifier

The electrifier 8 is connected to the electrode 12 and the steel plate 2 by the wire 71 and has a role of a power supply that applies a voltage and/or a current between the electrode 12 and the steel plate 2. At the same time, the electrifier 8 also has a role of a current/voltage detector (detector) that detects a current and/or a voltage flowing between the electrode 12 and the steel plate 2 as a result of the application of the voltage and/or the current. A specific example of the electrifier 8 used may be a potentiostat/galvanostat controllable as a method of voltage/current application.

The electrifier 8 is electrically connected or wirelessly connected to the controller 9, to be described later, and is controlled by the controller 9. A voltage value and/or a current value (also referred to as "an applied voltage value and/or an applied current value") actually applied by the electrifier 8, a current value and/or a voltage value (also referred to as "a detected current value and/or a detected voltage value") detected by the electrifier 8, and electrification information, such as the electrification time, are transmitted to the controller 9.

It is desirable that the electrifier 8 applies, between the electrode 12 and the steel plate 2, a voltage and/or a current gradually increasing relative to time, preferably, a voltage and/or a current gradually increasing proportionally relative to time. Accordingly, the defect occurrence status of the electrodeposition coating 4 can be evaluated accurately within a shorter period of time.

Controller

The controller 9 is, for example, a known microcomputer-based device and includes a control unit 91, a storage unit 92, and an arithmetic unit 93. Furthermore, the controller 9 includes an input unit 94 formed of, for example, a keyboard, and an output unit 95 formed of, for example, a display. The storage unit 92 stores information, such as various types of data and an arithmetic processing program. The arithmetic unit 93 performs various types of arithmetic processing based on, for example, the aforementioned information stored in the storage unit 92 and information input via the input unit 94. Based on, for example, the data stored in the storage unit 92 and the arithmetic result obtained by the arithmetic unit 93, the control unit 91 outputs a control signal to the electrifier 8 and controls the voltage and/or the current to be applied to the external circuit 7 by the electrifier 8.

Although details will be described later, the controller 9 functions as an evaluator that evaluates the defect occurrence status of the electrodeposition coating 4 based on the waveform of temporal change data of the current and/or the voltage detected by the electrifier 8. In particular, the controller 9 preferably evaluates the defect occurrence status of the surface treatment coating based on a peak of the waveform.

Corrosion-Resistance Testing Method for Coated Metal Member

Figure 2:
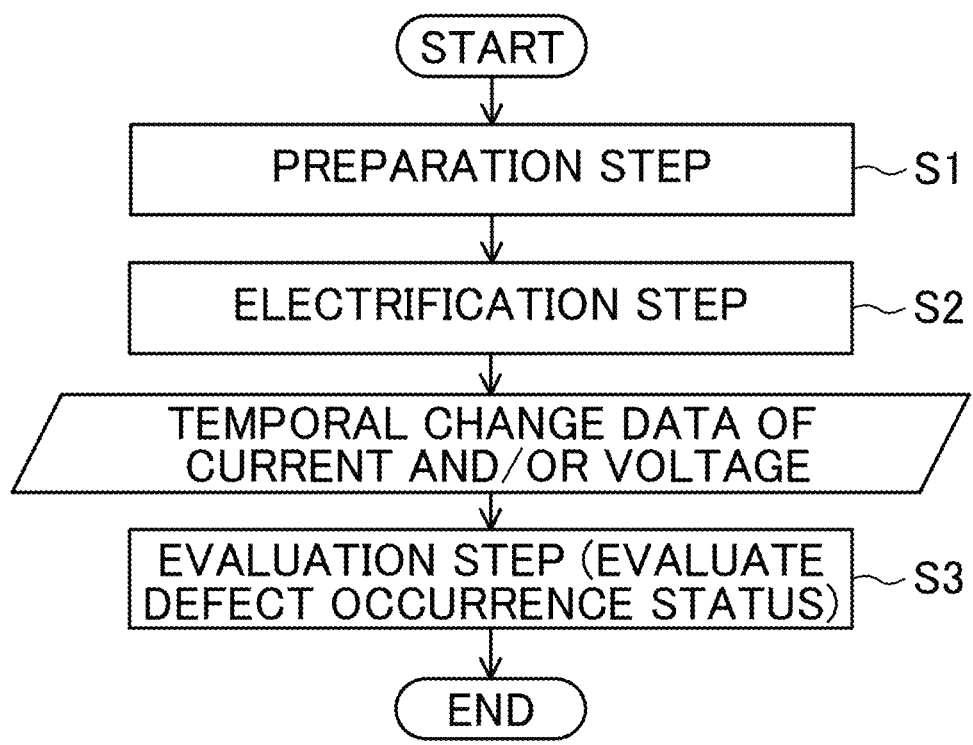
FIG. 2 is a flowchart illustrating a process of a corrosion-resistance testing method according to the first embodiment.
Figure 3:
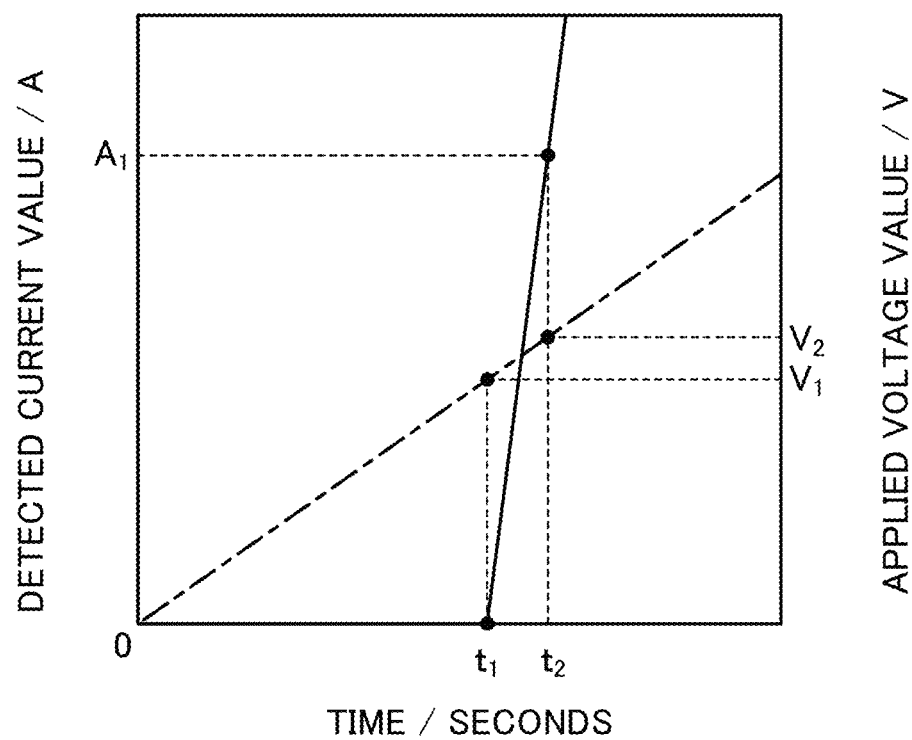
FIG. 3 illustrates an example of a change in an applied voltage (single-dotted chain line) and a change in a current (solid line) flowing between an electrode and a steel plate in accordance with voltage application when a corrosion resistance test is performed on a coated metal member having a normal electrodeposition coating.
Figure 4:
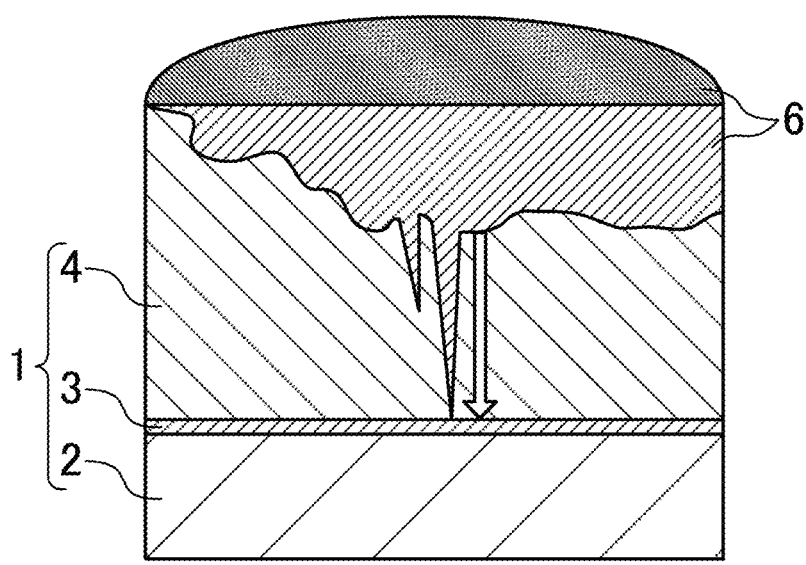
FIG. 4 is a diagram for explaining an example of a conduction mechanism in the coated metal member having the normal electrodeposition coating.
Figure 6:
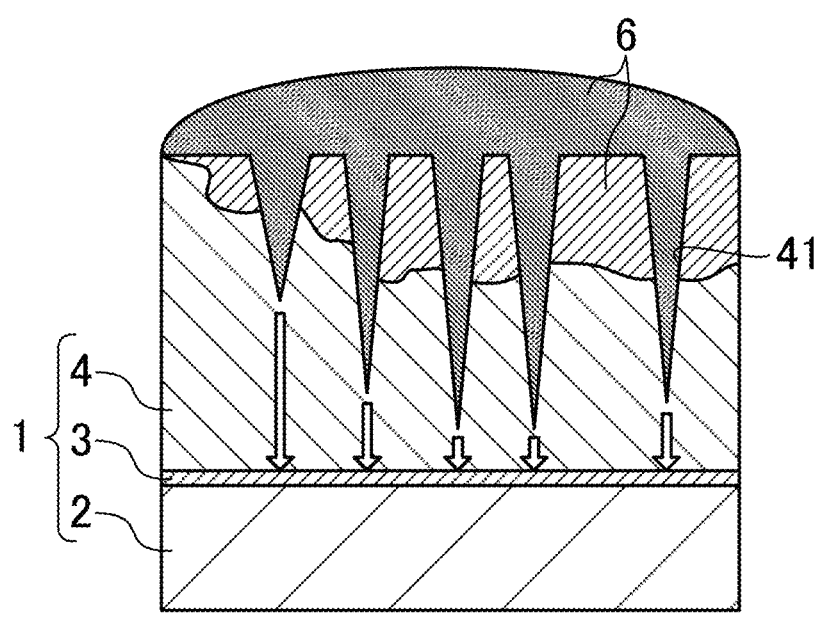
FIG. 6 is a diagram for explaining an example of a conduction mechanism in the coated metal member provided with the electrodeposition coating having gas pinholes.
Figure 7:
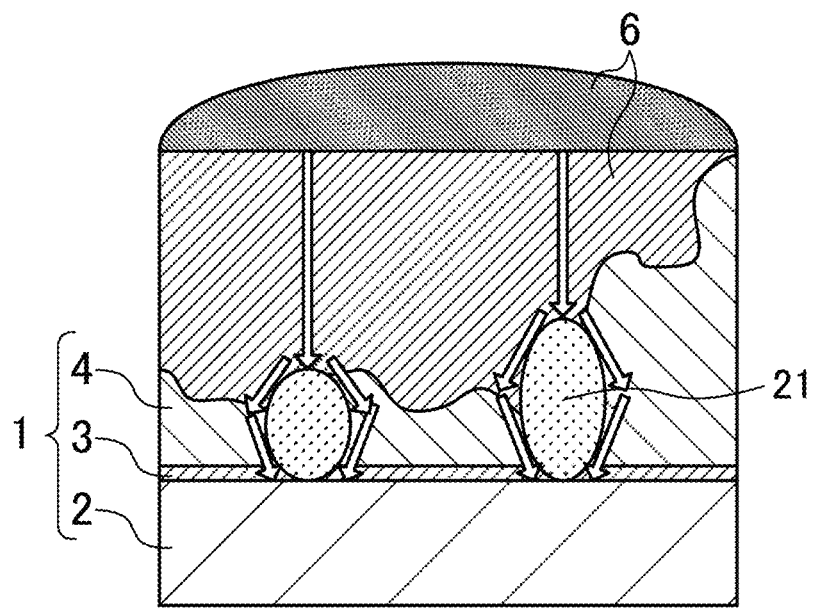
FIG. 7 is a diagram for explaining an example of a conduction mechanism in the coated metal member having foreign objects on the surface of the steel plate.
Figure 8:
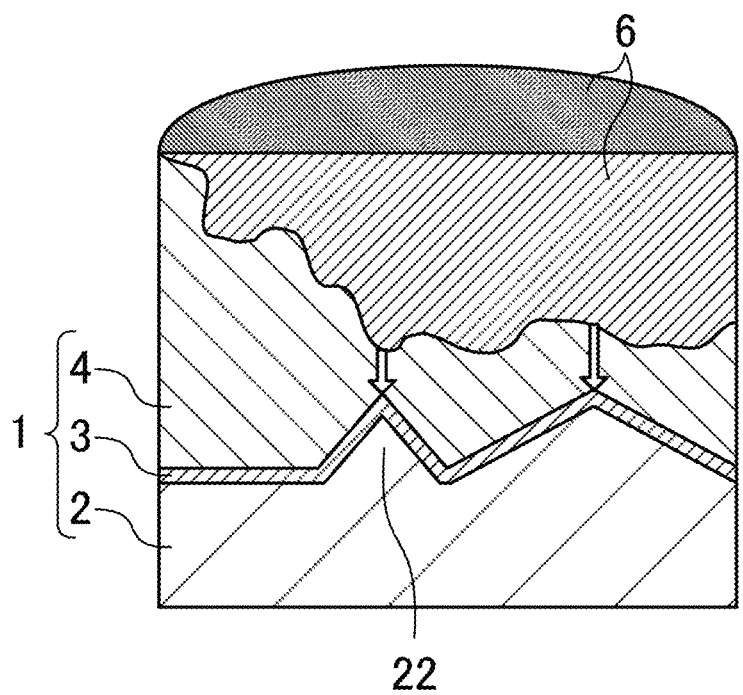
FIG. 8 is a diagram for explaining an example of a conduction mechanism in the coated metal member having protrusions and recesses on the surface of the steel plate.

FIG. 2 is a flowchart illustrating a process of a corrosion-resistance testing method according to this embodiment. FIG. 3 illustrates an example of a change in an applied voltage (single-dotted chain line) and a change in a current (solid line) flowing between the electrode and the steel plate in accordance with voltage application when a corrosion resistance test is performed on a coated metal member having a normal electrodeposition coating. FIG. 4 is a diagram for explaining an example of a conduction mechanism in the coated metal member having the normal electrodeposition coating. FIG. 5 illustrates digital microscope photographs indicating examples of local defects. FIG. 6 is a diagram for explaining an example of a conduction mechanism in the coated metal member provided with the electrodeposition coating having gas pinholes. FIG. 7 is a diagram for explaining an example of a conduction mechanism in the coated metal member having foreign objects on the surface of the steel plate. FIG. 8 is a diagram for explaining an example of a conduction mechanism in the coated metal member having protrusions and recesses on the surface of the steel plate. FIG. 9 is a diagram for explaining the concept of the corrosion-resistance testing method according to this embodiment. The corrosion-resistance testing method according to this embodiment will be described below with reference to FIGS. 2 to 9.

As shown in FIG. 2, the corrosion-resistance testing method according to this embodiment includes a preparation step S1, an electrification step S2, and an evaluation step S3.

Preparation Step

The preparation step S1 involves disposing the corrosion factor 6 that comes into contact with the surface of the electrodeposition coating 4 and the electrode 12 that comes into contact with the corrosion factor 6 at the electrodeposition coating 4 side of the coated metal member 1.

In detail, for example, the container 30 is first set on the surface of the electrodeposition coating 4 in a test piece of the coated metal member 1 with the sealing member 32 interposed therebetween, and the corrosion factor 6 is injected into the container 30. Then, the corrosion factor 6 is brought into contact with the surface of the electrodeposition coating 4. Moreover, the electrode 12 connected to the external circuit 7 is immersed in the corrosion factor 6.

Electrification Step

The electrification step S2 involves applying a voltage and/or a current between the electrode 12 and the steel plate 2 and measuring a temporal change in a current and/or a voltage occurring between the electrode 12 and the steel plate 2.

In detail, for example, the electrifier 8 applies a voltage and/or a current between the electrode 12 and the steel plate 2 under the control of the controller 9. In this case, it is desirable that the voltage and/or the current to be applied gradually increase/increases relative to time. Preferably, the voltage and/or the current gradually increase/increases proportionally relative to time. Accordingly, the defect occurrence status of the electrodeposition coating 4 can be evaluated accurately within a shorter period of time. If a voltage is to be applied, for example, the sweep rate of the applied voltage specifically ranges between 0.1 V/s and 10 V/s and more preferably ranges between 0.5 V/s and 2 V/s. If a current is to be applied, for example, the sweep rate of the applied current specifically ranges between 0.1 mA/s and 2 mA/s and more preferably ranges between 0.5 mA/s and 1 mA/s. The voltage and/or the current to be applied may be direct current (DC) or alternating current (AC).

Then, the electrifier 8 detects a current and/or a voltage occurring between the steel plate 2 and the surface of the electrodeposition coating 4 in accordance with the application of the voltage and/or the current. The detected current value and/or the detected voltage value are/is stored as temporal change data in the storage unit 92.

A threshold value may be provided for at least one of the applied voltage value and/or the applied current value and the detected current value and/or the detected voltage value. When the threshold value is reached, the applied voltage value and/or the applied current value may be fixed, or the electrification step may be terminated. Accordingly, application of an excessive voltage and/or current can be suppressed, and the measurement accuracy can be ensured.

Evaluation Step

The evaluation step S3 involves evaluating the defect occurrence status of the electrodeposition coating 4 based on the waveform of the temporal change data of the detected current value and/or the detected voltage value obtained in the electrification step S2. The correspondence relationship between the waveform of the temporal change data and the defect occurrence status of the electrodeposition coating 4 will be described below with reference to an example where a voltage is to be applied and a current is to be detected.

As shown in FIG. 3, in a case where the electrodeposition coating 4 is a normal coating, for example, when a direct-current voltage (i.e., the single-dotted chain line in FIG. 3) that gradually increases proportionally is applied between the electrode 12 and the steel plate 2, the temporal change data of the current value flowing between the electrode 12 and the steel plate 2 has the waveform indicated by the solid line in FIG. 3. Specifically, even when the applied voltage value is increased, a current hardly flows until the voltage reaches a voltage value $V_1$ at a time point $t_1$. The amount of current increases rapidly when the voltage exceeds the voltage value $V_1$. The amount of current reaches a threshold value $A_1$ at a voltage value $V_2$ (time point $t_2$). This temporal change in the current value indicates that the blocking performance of the electrodeposition coating 4 against the corrosion factor 6 is maintained until the voltage value $V_1$ is reached. When the voltage value $V_2$ is reached, the voltage application accelerates the penetration of the corrosion factor 6 into the electrodeposition coating 4, as shown in FIG. 4. This indicates that the corrosion factor 6 has reached the surface of the steel plate 2 via the most fragile, but not defective, location of the electrodeposition coating 4, that is, for example, a location having a relatively small amount of the crosslinked structure of the resin. In other words, the rapid increase in the detected current value in FIG. 3 indicates that the insulation property, that is, the blocking performance, of the electrodeposition coating 4 is lost due to the corrosion factor 6 reaching the surface of the steel plate 2. Assuming that the applied voltage value $V_2$ when the detected current value reaches the threshold value $A_1$ is defined as an insulation voltage, the time point $t_2$ at which the insulation voltage $V_2$ is reached corresponds to a time period for the corrosion factor 6 to reach the steel plate 2, that is, a corrosion suppression period of the coated metal member 1.

On the other hand, if the electrodeposition coating 4 has a local defect, it is predicted that the waveform of the temporal change in the detected current value may differ from the waveform shown in FIG. 3.

A local defect may conceivably be a defect that accelerates the penetration of the corrosion factor 6, that is, a defect that locally reduces the substantial coating thickness, namely, an effective coating thickness. In addition to gas pinholes, spatter, and slag shown in FIG. 5, other specific examples include foreign matter, such as iron powder, repellence, a chemical sludge contaminant, and protrusions and recesses on the surface of the steel plate 2.

The digital microscope photographs of the gas pinholes in FIG. 5 indicate how the electrodeposition coating 4 is observed directly from above. A gas pinhole is a needle-hole-like pinhole formed when gas is produced in the electrodeposition coating 4 while the electrodeposition coating 4 is being formed. In detail, for example, a gas pinhole is formed due to gas produced when an excessively high coating voltage is applied during an electrodeposition coating process. Specifically, when gas, such as hydrogen gas, is produced during the coating process, a hole is formed in the electrodeposition coating 4 as an escape route for the gas immediately after the coating process. During a baking process, a flow phenomenon occurring with a decrease in the viscosity of the coating material causes the hole, if small enough, to be blocked. However, a large hole is not sufficiently blocked and remains in the surface of the electrodeposition coating 4 to act like a well, thus resulting in a gas pinhole. Therefore, a location where a gas pinhole exists has a hole in the surface of the electrodeposition coating 4. However, since the electrodeposition coating 4 exists at the steel plate 2 side, the effective coating thickness of the electrodeposition coating 4 at the location where the gas pinhole exists is smaller than the coating thickness of the electrodeposition coating 4 at a location where the gas pinhole does not exist.

As shown in FIG. 6, in a case where the electrodeposition coating 4 has gas pinholes 41, the effective coating thickness of the electrodeposition coating 4 is smaller for gas pinholes 41 extending deeper into the electrodeposition coating 4 in the thickness direction thereof. In view of the fact that the corrosion factor 6 enters the gas pinholes 41 and further penetrates the electrodeposition coating 4 below the gas pinholes 41, it is conceivable that conduction occurs starting from the gas pinhole location with the smallest effective coating thickness, that is, the deepest gas pinhole location.

Spatter formed in, for example, a welded part of the steel plate 2 shown in FIG. 5 is metallic-particle-like foreign matter. Since spatter is electrically-conductive foreign matter, the coating material becomes deposited on the spatter during the electrodeposition coating process. However, the flow phenomenon occurring with the decrease in the viscosity of the coating material during the baking process causes the coating material deposited on the spatter to flow toward a location where there is no spatter. Thus, the effective coating thickness of the electrodeposition coating 4 on the spatter is smaller than the coating thickness of the electrodeposition coating 4 at the location where there is no spatter. Specifically, spatter is not necessarily a defect formed in the electrodeposition coating 4 but may be treated as a local defect in the electrodeposition coating 4 in view of the fact that spatter causes the effective coating thickness of the electrodeposition coating 4 to decrease. An example of foreign matter similar to spatter is iron powder deposited on the surface of the steel plate 2 during the coating process. Furthermore, in a case where the steel plate 2 used has protrusions and recesses on the surface thereof, as in a hot-stamped member, the protrusions on the surface of the steel plate 2 are equivalent to the foreign matter similar to spatter.

Moreover, for example, slag formed in a welded part of the steel plate 2 is a glass-particle-like object. Slag is a type of foreign matter formed on the surface of the steel plate 2 but is nonconductive foreign matter. Therefore, during the electrodeposition coating process, the coating material is not deposited on the surface of the steel plate 2 having the slag. The flow phenomenon occurring with the decrease in the viscosity of the coating material during the baking process causes the coating material deposited on the surface of the steel plate 2 surrounding the slag to flow onto the slag, whereby a coating is formed. Thus, the effective coating thickness of the electrodeposition coating 4 formed on the slag is smaller than the coating thickness of the electrodeposition coating 4 at a location where there is no slag.

Specifically, slag is not necessarily a defect formed in the electrodeposition coating 4 but may be treated as a local defect in the electrodeposition coating 4, similar to spatter, in view of the fact that slag causes the effective coating thickness of the electrodeposition coating 4 to decrease. In addition to slag, an example of such nonconductive foreign matter is a chemical sludge contaminant composed of iron phosphate produced during a chemical conversion process.

As shown in FIGS. 7 and 8, in a case where the surface of the steel plate 2 has foreign objects 21 or protrusions 22, the effective coating thickness of the electrodeposition coating 4 above the foreign objects 21 or the protrusions 22 is smaller than the coating thickness of the electrodeposition coating 4 at locations where there are no foreign objects 21 or locations other than the protrusions 22. Similar to the case where there are gas pinholes, it is conceivable that conduction may readily occur at the defective locations where the effective coating thickness is small. As shown in FIG. 7, in the case where the surface of the steel plate 2 has the foreign objects 21, conduction may conceivably occur via the surface of each foreign object 21. It is predicted that the ease of occurrence of conduction may vary depending on whether the foreign objects 21 are conductive or nonconductive.

Accordingly, if the electrodeposition coating 4 has a local defect, that is, a location where the effective coating thickness is small, it is conceivable that the waveform of the temporal change data obtained in the electrification step S2 is, for example, as shown in FIG. 9. In FIG. 9, the left-end cell illustrates an example where a gas pinhole exists as a local defect. Specifically, as shown in the left-end cell in FIG. 9, if the electrodeposition coating 4 has a local defect, the corrosion factor 6 penetrates the entire electrodeposition coating 4, and local infiltration of the corrosion factor 6 occurs at the defective location. When the corrosion factor 6 penetrates the electrodeposition coating 4 at a certain defective location and reaches the steel plate 2, the detected current value slightly increases. Assuming that a voltage higher than or equal to a voltage at which electrolysis of water occurs is applied between the electrode 12 and the steel plate 2 at this time point, the conduction causes an electrochemical reaction, such as electrolysis of water, to occur at the surface of the steel plate 2. Then, gas or an electrolysis product produced as a result of the electrochemical reaction accumulates in the defect and blocks the conduction, so that the slightly-increased detected current value decreases. Specifically, when there is a local defect, the conduction and the blockage thereof at the defective location cause a peak indicating a rapid increase and a rapid decrease in the current value to form in the waveform of the temporal change data of the detected current value. Since it is conceivable that conduction occurs with lower applied voltage values for locations where the effective coating thickness is small, the applied voltage value that provides the peak conceivably has a correlation with the effective coating thickness. If there are a plurality of defects, it is conceivable that the number of peaks generated corresponds to the number of defects.

As shown in part (1) in FIG. 9, when a gradually-increasing voltage (DC) is applied, it is conceivable that the detected current value gradually increases and that peaks appear in correspondence with the number of local defects. As shown in part (2) in FIG. 9, when a constant voltage (DC) is applied, it is conceivable that peaks appear in correspondence with the number of local defects and that the baseline of the current value also increases in a stepwise fashion. Furthermore, as shown in part (3) in FIG. 9, when a gradually-increasing voltage (AC) is applied, it is conceivable that the amplitude of the current value gradually increases and that peaks appear at the positive side or the negative side in correspondence with the number of local defects. As shown in part (4) in FIG. 9, when a constant voltage (AC) is applied, it is conceivable that the amplitude of the current value is substantially constant and that peaks appear at the positive side or the negative side in correspondence with the number of local defects.

Accordingly, the defect occurrence status of the electrodeposition coating 4, such as whether or not a defect exists, the effective coating thickness at a defective location, and the number of defects per unit area, can be evaluated readily and accurately based on the waveform of the temporal change data of the detected current value and/or the detected voltage value, preferably, a peak of the waveform. The defect occurrence status can be evaluated in more detail by analyzing, for example, the shape of a peak appearing in the waveform, the number of peaks, the applied voltage value and/or the applied current value providing the peak, a peak value of the detected current and/or voltage, and the shape of the baseline of the waveform. Thus, the reliability of the corrosion resistance test is enhanced. In the coated metal member 1 having a local defect, the time period up until a first peak is observed may be considered as the corrosion suppression period.

For an analysis of the waveform of the temporal change data, including a peak detection process, an image processing technique, such as machine learning, or a mathematical technique, such as differentiation, may be used. Alternatively, these techniques may be used in combination with each other.

Based on the analytical result of the waveform of the temporal change data, it is possible to predict a problem in the electrodeposition coating 4 of the coated metal member 1, estimate the cause thereof, and perform process management thereon.

In detail, for example, the waveform of the temporal change data may be analyzed by periodically extracting a component from a manufacturing line, or the waveform of the temporal change data in a commercially-available product may be periodically analyzed, so that the local-defect occurrence status and an increase and decrease in the number of defects in the coated metal member 1 can be monitored. This can contribute to, for example, confirmation of the quality of the electrodeposition coating 4, prediction of deterioration in the quality thereof, and confirmation of an effect of the market environment on the electrodeposition coating 4.

Furthermore, for example, the manufacturing process of the coated metal member 1 is mainly divided into four processes, namely, a shaping-machining process of the steel plate 2, a degreasing process, a chemical conversion process, and an electrodeposition coating process. Spatter and slag occur due to, for example, welding conditions in the shaping-machining process of the steel plate 2. Iron powder occurs due to, for example, the degree of cleanliness of the steel plate 2 or degradation of a machining tool in the shaping-machining process of the steel plate 2. Repellence occurs in accordance with the degree of residual oil in the degreasing process. Sludge occurs in the chemical conversion process in accordance with the degree of rinsing after the chemical conversion, such as the water pressure or the spray condition of cleaning water. Gas pinholes occur due to coating conditions, such as the voltage and the coating material balance, in the electrodeposition coating process. Thus, by combining the analysis of the waveform of the temporal change data preferably with a result of surface observation, the type of a defect and the process that contributes to the occurrence of the defect can be identified.

Furthermore, at the manufacturing site of the coated metal member 1, temporal change data in the same manufacturing line, temporal change data at the same factory, temporal change data at another factory, and temporal change data at a factory of another manufacturer may be stored in a database, so that the defect occurrence status of the electrodeposition coating 4 can be evaluated more accurately based on a comparison among these pieces of data.

By identifying the affecting process and analyzing differences in performance between the factories, the quality of the electrodeposition coating 4 can be ensured and the cause of deterioration in the quality of the electrodeposition coating 4 can be estimated. Moreover, based on a linkage with production management conditions, quality process management can be realized with respect to an anti-corrosion range. Furthermore, by combining this evaluation technique with another analysis technique, the coating composition, the anti-corrosion function, and the development process thereof can be managed in an integrated fashion.

By collecting and analyzing a large number of pieces of the aforementioned temporal change data related to the coated metal member 1 provided with the electrodeposition coating 4 having various types of local defects, the correspondence relationship between the waveform and the types of local defects can be clarified, so that it is conceivable that the types of local defects and the conductive and nonconductive properties of the foreign matter can possibly be identified based on the waveform analysis alone.

Test Examples

The following description relates to examples of tests performed for indicating specific examples of the temporal change data.

First, a test piece (also referred to as "TP" hereinafter) to be used in each of corrosion resistance tests according to test examples is fabricated.

The specifications of the coated metal member 1 are as follows. Specifically, the metallic substrate used is obtained by forming a zinc phosphate coating as the chemical conversion coating 3 on the surface of a GA (test examples 1, 2-1, 2-2, 3, 4-1, 4-2, and 6) or a hot-stamped member (test example 5) serving as the steel plate 2. The time used for the chemical conversion process for forming the zinc phosphate coating is 120 seconds. The electrodeposition coating 4 composed of epoxy-based resin is formed as the surface treatment coating. The electrodeposition baking conditions and the thickness of the electrodeposition coating 4 are as shown in FIGS. 10 and 11.

The corrosion factor 6 used is a 5%-by-mass sodium chloride solution, and a voltage is applied thereto at a temperature of 25° C. while increasing the voltage at 1 V/s until the detected current value reaches a threshold current value of 10 mA. A current value occurring between the electrode 12 and the steel plate 2 is detected every second. FIGS. 10 and 11 illustrate temporal change data in which the detected current value is plotted out relative to the applied voltage value, as well as digital microscope photographs of the surface of the TP after a coating process or the surface thereof after a combined cyclic test (CCT).

As the test conditions for the CCT, a salt-water spraying step (6 hours), a drying step (3 hours), a wetting step (14 hours), and an air blowing step (1 hour) are performed on the TP for a predetermined time period at 24 hours per cycle.

As shown in FIG. 10, in the TP having the normal electrodeposition coating 4 according to test example 1, the waveform of the temporal change data has a pattern indicating a rapid increase in the current value at a time point when the applied voltage value exceeds 250 V. Then, when the TP according to test example 1 undergoes the CCT, no corrosion is observed in the electrodeposition coating 4 after 30 days and 60 days.

In the TP provided with the electrodeposition coating 4 having gas pinholes according to each of test examples 2-1 and 2-2, the waveform of the temporal change data is different from the waveform of the temporal change data according to test example 1 in that peaks appear in the detected current value. In test example 2-1 having a larger number of gas pinholes, the number of peaks appearing in the waveform is larger than that in test example 2-2 having a smaller number of gas pinholes. When the TP according to each of test examples 2-1 and 2-2 undergoes the CCT, a corrosion progression is observed after 30 days. It is conceivable that the origins of the corrosion are where the gas pinholes exist. In test example 2-1, a larger number of origins of the corrosion are observed, as compared with test example 2-2.

In the TP having a chemical sludge contaminant according to test example 3, a plurality of peaks appear in the waveform of the temporal change data.

As shown in FIG. 11, in the TP having weld spatter according to each of test examples 4-1 and 4-2, a plurality of peaks appear in the waveform of the temporal change data. In test example 4-1 having a larger number of weld spatter spots, the number of peaks appearing in the waveform is larger than that in test example 4-2 having a smaller number of weld spatter spots. By observing the surface of the TP according to each of test examples 4-1 and 4-2 after the electrodeposition coating process, it is clear that the electrodeposition coating 4 has bulged due to the weld spatter.

In the TP according to test example 5 in which a hot-stamped member serves as the steel plate 2, a plurality of peaks appear in the waveform of the temporal change data. When the TP according to test example 5 undergoes the CCT, a corrosion progression is observed at a plurality of origins after 30 days. It is conceivable that the locations of these origins are the locations of protrusions of the steel plate 2.

In the TP according to test example 6, the type of local defect is unknown, but a plurality of peaks appear in the waveform of the temporal change data. When the TP according to test example 6 undergoes the CCT, a corrosion progression is observed at a plurality of origins after 30 days.

Corrosion-Resistance Testing Program and Storage Medium

At least one or more of the steps included in the above corrosion-resistance testing method are programmed as a corrosion-resistance testing program. In detail, the corrosion-resistance testing program according to this embodiment causes a computer to execute at least the evaluation step S3, preferably, the electrification step S2 and the evaluation step S3, of the above-described steps. The corrosion-resistance testing program may be executed by the control unit 91 and the arithmetic unit 93 while being stored in the storage unit 92. Furthermore, as an alternative to being stored in the storage unit 92, the corrosion-resistance testing program may be stored in any of various known computer-readable storage media, such as an optical disk medium or a magnetic tape medium. The corrosion-resistance testing program may be read by attaching such a storage medium to a reader (not shown) of the controller 9, whereby the program is executable.

Second Embodiment

A second embodiment according to the present disclosure will be described in detail below. In the description of this embodiment, sections identical to those in the first embodiment will be given the same reference signs, and detailed descriptions thereof will be omitted.

Figure 12:
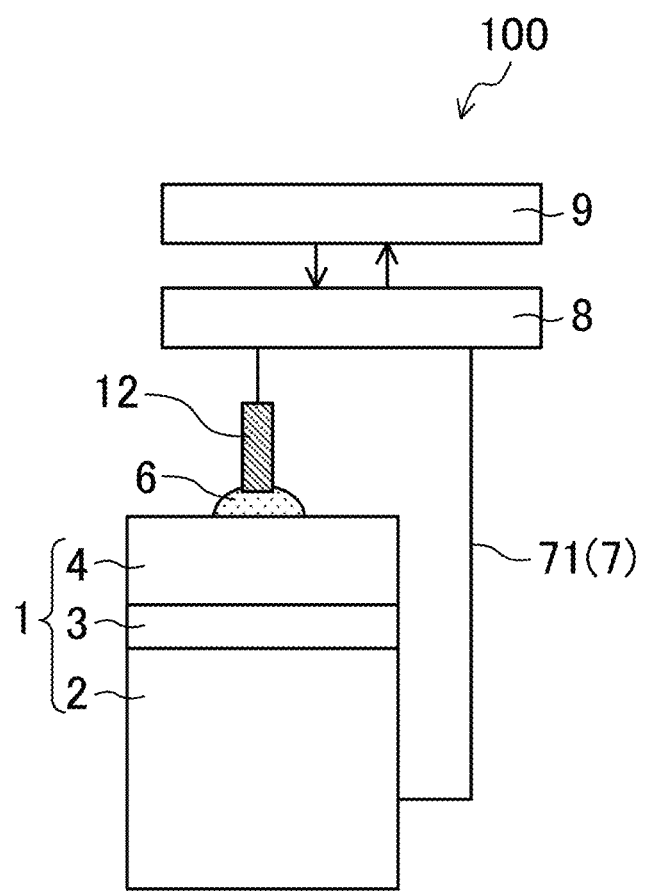
FIG. 12 illustrates an example of a corrosion-resistance testing apparatus for a coated metal member according to a second embodiment.

As an alternative to the corrosion-resistance testing apparatus 100 according to the first embodiment in which the corrosion factor 6 is contained in the container 30, for example, the electrode 12 used may be of a probe type, as shown in FIG. 12.

In this embodiment, the preparation step S1 involves disposing the corrosion factor 6 on the surface of the electrodeposition coating 4. If the corrosion factor 6 is mud-like or is a material with high viscosity, the corrosion factor 6 may be disposed directly on the electrodeposition coating 4. If the corrosion factor 6 is composed of a material with low viscosity, such as an aqueous solution, a porous material, such as a sponge, may be soaked with the corrosion factor 6 and be disposed on the surface of the electrodeposition coating 4. Then, the end of the electrode 12 is brought into contact with the corrosion factor 6 disposed on the surface of the electrodeposition coating 4. In this case, in a state where the corrosion factor 6 is adhered to the end of the electrode 12, the end is preferably brought into contact with the corrosion factor 6. With the corrosion factor 6 adhered to the end of the electrode 12, contact resistance at the interfaces among the electrode 12, the corrosion factor 6, and the surface of the electrodeposition coating 4 can be reduced.

According to the above-described configuration, the test piece is not limited in shape, thereby facilitating the measurement with respect to, for example, a test piece not having a flat surface, an edge of a test piece, and a curved section of a test piece.

The present disclosure is extremely advantageous in being able to provide a corrosion-resistance testing method for a coated metal member, a corrosion-resistance testing apparatus for a coated metal member, a corrosion-resistance testing program for a coated metal member, and a storage medium storing the program by which the state of a surface treatment coating can be evaluated accurately and readily in more detail.

What is claimed is:

1. A corrosion-resistance testing method for a coated metal member formed of a metallic substrate provided with a surface treatment coating, the corrosion-resistance testing method comprising:
    an electrification step for applying a voltage and/or a current between an electrode disposed at the surface treatment coating side of the coated metal member and the metallic substrate in a state where a corrosion factor is disposed between the surface treatment coating and the electrode and in contact with the surface treatment coating and the electrode so as to measure a temporal change in a current and/or a voltage occurring between the electrode and the metallic substrate; and
    an evaluation step for evaluating a defect occurrence status of the surface treatment coating based on a waveform of the temporal change,
    wherein there is only one electrode disposed at the surface treatment coating side of the coated metal member as the corrosion-resistance testing method is performed.

2. The corrosion-resistance testing method for the coated metal member according to claim 1,
    wherein the evaluation step includes evaluating the defect occurrence status based on a peak of the waveform.

3. The corrosion-resistance testing method for the coated metal member according to claim 2,
    wherein the surface treatment coating is insulative, and
    wherein a location where a defect exists is where the surface treatment coating exists, and a coating thickness of the surface treatment coating at the location where the defect exists is smaller than the coating thickness of the surface treatment coating at a location where the defect does not exist.

4. The corrosion-resistance testing method for the coated metal member according to claim 1,
    wherein the electrification step includes applying the voltage and/or the current gradually increasing relative to time or gradually increasing proportionally relative to time.

5. The corrosion-resistance testing method for the coated metal member according to claim 4,
    wherein the surface treatment coating is insulative, and
    wherein a location where a defect exists is where the surface treatment coating exists, and a coating thickness of the surface treatment coating at the location where the defect exists is smaller than the coating thickness of the surface treatment coating at a location where the defect does not exist.

6. The corrosion-resistance testing method for the coated metal member according to claim 1,
wherein the metallic substrate includes a chemical conversion coating formed on a surface of the metallic substrate, and
wherein the surface treatment coating is provided on the surface of the metallic substrate with the chemical conversion coating interposed therebetween.

7. The corrosion-resistance testing method for the coated metal member according to claim 1,
wherein the metallic substrate is a steel plate for an automotive component.

8. The corrosion-resistance testing method for the coated metal member according to claim 1,
wherein the surface treatment coating is an electrodeposition coating formed by using a resin-based coating material.

9. The corrosion-resistance testing method for the coated metal member according to claim 1,
wherein the surface treatment coating is insulative, and
wherein a location where a defect exists is where the surface treatment coating exists, and a coating thickness of the surface treatment coating at the location where the defect exists is smaller than the coating thickness of the surface treatment coating at a location where the defect does not exist.

10. A corrosion-resistance testing apparatus for a coated metal member formed of a metallic substrate provided with a surface treatment coating, the corrosion-resistance testing apparatus comprising:
only one electrode disposed at the surface treatment coating side of the coated metal member;
a power supply configured to apply a voltage and/or a current between the electrode and the metallic substrate in a state where a corrosion factor is disposed between the surface treatment coating and the electrode and in contact with the surface treatment coating and the electrode;
a detector configured to detect a current and/or a voltage occurring between the electrode and the metallic substrate in accordance with the voltage and/or the current applied by the power supply; and
an evaluator configured to evaluate a defect occurrence status of the surface treatment coating based on a waveform of a temporal change in the current and/or the voltage detected by the detector.

11. The corrosion-resistance testing apparatus for the coated metal member according to claim 10,
wherein the evaluator is configured to evaluate the defect occurrence status based on a peak of the waveform.

12. The corrosion-resistance testing apparatus for the coated metal member according to claim 11,
wherein the surface treatment coating is insulative, and
wherein a location where a defect exists is where the surface treatment coating exists, and a coating thickness of the surface treatment coating at the location where the defect exists is smaller than the coating thickness of the surface treatment coating at a location where the defect does not exist.

13. The corrosion-resistance testing apparatus for the coated metal member according to claim 10,
wherein the power supply is configured to apply the voltage and/or the current gradually increasing relative to time or gradually increasing proportionally relative to time.

14. The corrosion-resistance testing apparatus for the coated metal member according to claim 13,
wherein the surface treatment coating is insulative, and
wherein a location where a defect exists is where the surface treatment coating exists, and a coating thickness of the surface treatment coating at the location where the defect exists is smaller than the coating thickness of the surface treatment coating at a location where the defect does not exist.

15. The corrosion-resistance testing apparatus for the coated metal member according to claim 10,
wherein the surface treatment coating is insulative, and
wherein a location where a defect exists is where the surface treatment coating exists, and a coating thickness of the surface treatment coating at the location where the defect exists is smaller than the coating thickness of the surface treatment coating at a location where the defect does not exist.

16. A corrosion-resistance testing program for a coated metal member formed of a metallic substrate provided with a surface treatment coating, the corrosion-resistance testing program causing a computer to execute a process comprising:
evaluating a defect occurrence status of the surface treatment coating based on a waveform of a temporal change in a current and/or a voltage occurring between an electrode disposed at the surface treatment coating side of the coated metal member and the metallic substrate as a result of applying a voltage and/or a current between electrode and the metallic substrate in a state where a corrosion factor is disposed between the surface treatment coating and the electrode and in contact with the surface treatment coating and the electrode,
wherein there is only one electrode disposed at the surface treatment coating side of the coated metal member as the corrosion-resistance testing program is performed.

17. The corrosion-resistance testing program for the coated metal member according to claim 16,
wherein the surface treatment coating is insulative, and
wherein a location where a defect exists is where the surface treatment coating exists, and a coating thickness of the surface treatment coating at the location where the defect exists is smaller than the coating thickness of the surface treatment coating at a location where the defect does not exist.

18. A computer-readable storage medium storing the corrosion-resistance testing program for the coated metal member according to claim 16.

* * * * *